March 28, 1967 R. W. LE GATES ETAL 3,311,124
PRESSURE REGULATING APPARATUS
Filed July 9, 1964

WITNESSES:
Bernard R. Gieguay
James F. Young

INVENTORS
Ralph W. LeGates and
Gilbert F. Hyde.
BY
Frank Cristiano Jr.

United States Patent Office 3,311,124
Patented Mar. 28, 1967

3,311,124
PRESSURE REGULATING APPARATUS
Ralph W. Le Gates, Thornbury Township, and Gilbert F. Hyde, Brookhaven Township, Pa., assignors to Westinghouse Electric Corporation, Pittsburgh, Pa., a corporation of Pennsylvania
Filed July 9, 1964, Ser. No. 381,504
5 Claims. (Cl. 137—110)

This invention relates to a fluid pressure regulating device, and more particularly to a fluid pressure regulating device that is automatically trippable by loss of fluid pressure, yet not automatically resettable by a restoration of fluid pressure, and has for an object to provide an improved device of this type.

Turbine power plants, for example, steam turbine driven electrical generating plants, usually employ fluid actuated servomotors for controlling the steam throttle valves. The fluid pressure to the servomotors is regulated by an adjustable pressure regulator, so that as the controlled fluid pressure is increased by the operator, the throttle valves move from the closed position to a selected open position, thereby increasing the steam flow to the turbine to the rate required to assume the load on the turbine.

The turbine is also equipped with protective devices, such as an overspeed trip device, to shut off the throttle valve in the event of overspeeding of the turbine shaft, indicative of reduction or loss of load on the turbine. These protective devices usually automatically trip a "dump" valve in the hydraulic system, and the resulting loss of fluid pressure in the throttle valve servomotor causes the throttle valve to close rapidly and terminate steam flow to the turbine.

The fluid pressure controlling device must automatically trip to the "dump" position in response to loss of fluid pressure indicative of overspeed, yet must not automatically reset upon restoration of such fluid pressure incident to relatching of the tripped overspeed device during restarting the turbine, since the throttle valve would then immediately open to the controlled pressure setting of the pressure regulator, with undesirable consequences.

Accordingly, the pressure regulator is arranged to operate in such a manner that it must first be returned to the minimum regulated pressure setting in order to reassume control of fluid pressure regulation. Then the desired fluid pressure for opening the throttle valve may again be attained under the control of the operator.

Fluid pressure regulators of the above type are generally known. However, they have been of complex design, and expensive to manufacture. Further, due to their complexity, they have not attained the high order of reliability required for such critical and vital service.

Accordingly, a further object of the invention is to provide an adjustable fluid pressure regulator of the above type that is of simple structure, relatively inexpensive to manufacture, yet positive in operation and of improved reliability in service.

A more specific object of the invention is to provide an adjustable fluid pressure regulator of the above type, wherein the fluid pressure regulating valve member is also employed as a dump valve and trippable to the wide open position upon loss of fluid pressure in the regulator.

Briefly, in accordance with the invention the improved adjustable fluid pressure regulator is provided with a housing divided into first and second chambers by a movable abutment, for example, a piston. The piston is biased toward the first chamber by a suitable spring member and means is provided for admitting to said first chamber pressurized fluid to be regulated. The piston is provided with at least one port providing a fluid communication between the two chambers and a valve member having a cup valve portion disposed in covering relation with the port is provided to regulate the pressure of fluid in the first chamber by bleeding a portion of the fluid to the second chamber and thence to a region of lower pressure. Means is further provided to position the valve member, as required to increase or decrease the bled fluid, thereby to respectively decrease or increase the controlled fluid pressure.

The valve member has a tubular portion slidably extending through a central opening in the piston from the first chamber to the second chamber, and the annular end portion of the tubular portion is provided with an annular seating surface for a blocking member. The blocking member is positionable by an adjusting device to jointly block the seating surface on the valve member and precisely position the valve member, as required to regulate the fluid pressure in the first chamber, as long as fluid pressure exists in the first chamber.

In the event that fluid pressure is lost in the first chamber, the piston forcibly and positively moves the valve member away from the blocking member and permits the fluid in the first chamber to "dump" through the tubular portion and the second chamber. Upon restoration of fluid pressure, the blocking member must be moved to the end of its travel to reengage the valve seat, before pressure can again build up in the first chamber. In this position, the piston spring is relaxed and the piston is readily movable by the fluid pressure away from the cup valve, so that the fluid pressure is regulated at a low value. To increase the fluid pressure to a higher desired regulated value, the blocking member is then moved in a direction away from the tubular member by the operator, and the valve member maintains its abutment therewith with a following motion under the influence of the fluid pressure.

The above and the objects are effected by the invention as will be apparent from the following description and claims taken in connection with the accompanying drawing, forming a part of this application, in which:

Figure 1:
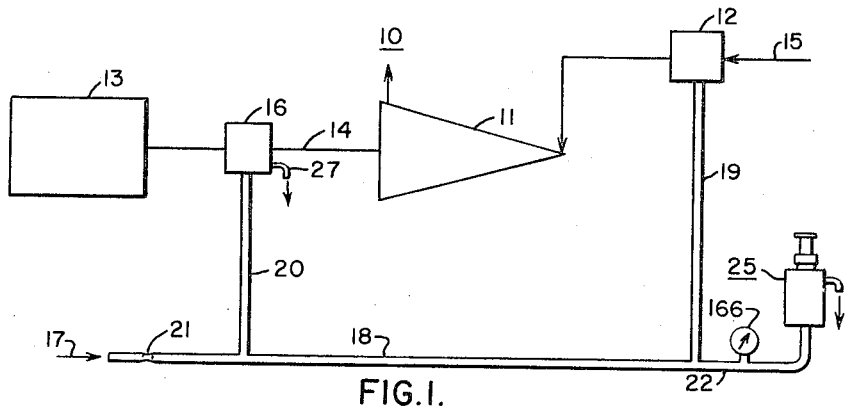
FIGURE 1 is a diagram illustrating a turbine power plant equipped with an adjustable hydraulic fluid pressure regulator formed in accordance with the invention.

Referring to the drawing in detail, in FIG. 1 there is shown diagrammatically, a power plant system generally designated 10 comprising a steam turbine 11 motivated by steam admitted thereto by a throttle valve mechanism 12, and a suitable load such as an electrical generator 13 connected to the turbine shaft 14 in any suitable manner and driven thereby. Steam is directed to the throttle valve mechanism 12 from any suitable steam generating supply (not shown), as indicated by the arrow 15, and the throttle valve mechanism 12 is controlled to provide the required motive steam flow to the turbine 11 to maintain the load 13 at the required speed. For example, as well known in the art, if the generator 13 is a two-pole 60 cycle A.C. generator, the speed of the shaft 14 is maintained at 3600 r.p.m. by regulating the motive steam flow from the throttle valve mechanism 12 to the turbine 11. In the event that the load on the generator 13 is reduced or lost for any reason, as well known in the art, the turbine 11 will immediately commence to overspeed and, unless controls are provided to shut off steam flow to the turbine as soon as possible after the load is lost, the speed of the shaft 14 may rise rapidly to unsafe speeds which might destroy the generator 13 and/or the turbine 11.

Accordingly, there is usually provided an overspeed sensing mechanism 16 associated with the shaft 14 and arranged to respond to such an overspeed condition.

In the power plant system described above, the throttle valve mechanism 12 is of the hydraulically actuated servomotor type. Accordingly, there is provided hydraulic fluid to actuate the throttle valve mechanism 12, and this fluid is directed thereto from any suitable supply (not shown) as indicated by the arrow 17 through a conduit structure including conduits 18 and 19 to the throttle valve mechanism. The overspeed sensing mechanism 16 is connected to the conduit 18 by a branch conduit 20. Hydraulic fluid from the supply is admitted to the conduit 18 by a suitable fluid restricting device or orifice 21 and in another branch conduit 22 there is provided a fluid pressure regulating device or regulator 25 for regulating the pressure of the fluid delivered to the throttle valve servo mechanism 12.

In a manner subsequently to be described in detail, the fluid pressure regulator 25 is adjustable to control the fluid pressurization value from a relatively low value to a relatively high value in a highly precise manner, and the throttle valve mechanism 12 is arranged in such a manner that as the pressure of the fluid directed thereto through the conduit 19 is increased to a progressively higher value, the throttle valve mechanism 12 is moved to a correspondingly more open position, thereby to admit more steam flow to the turbine 11 as required to pick up and maintain the load on the generator 13. Further, the throttle valve mechanism 12 is of the type wherein upon loss in hydraulic fluid pressure due to any malfunction, it immediately returns to the closed position and interrupts the flow of steam to the turbine 11.

The overspeed sensing mechanism 16 may be of any suitable type having internal valve structure (no shown) that is normally in closed position to maintain the pressurization of the fluid in the conduit structure 18, 19, 20 and 22 as regulated by the regulator 25. However, upon overspeeding of the shaft 14, the overspeed sensing mechanism 16 is effective to dump the fluid admitted thereto by the conduit 20, through a drain conduit 27 to drain or any other suitable region of lower pressure, thereby reducing the pressure level in the conduit structure and causing the throttle valve mechanism 12 to interrupt steam flow to the turbine 11. The overspeed sensing mechanism 16 is further of the type that automatically trips out upon occurrence of the overspeed condition and must be manually relatched to block the drain outlet 27 when it is desired to restore the plant to operation.

The above-described power plant system 10 as thus far described in conjunction with FIG. 1 is generally well known in the art. Accordingly, none of the components shown therein has been shown in detail, since their structure and operation as described above is well known.

Figure 2:
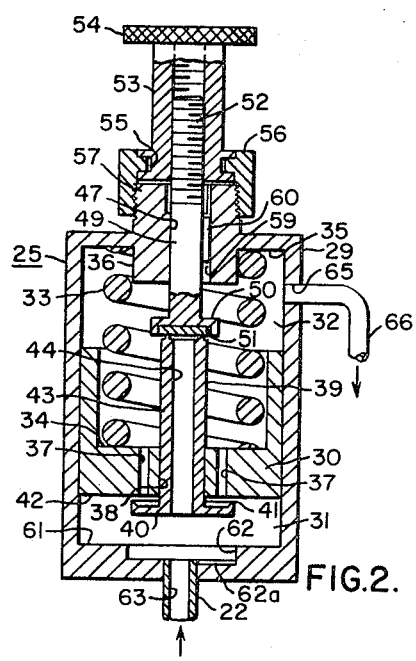
FIG. 2 is an axial sectional view of the regulator shown in FIG. 1, the regulator being shown in one position.
Figure 3:
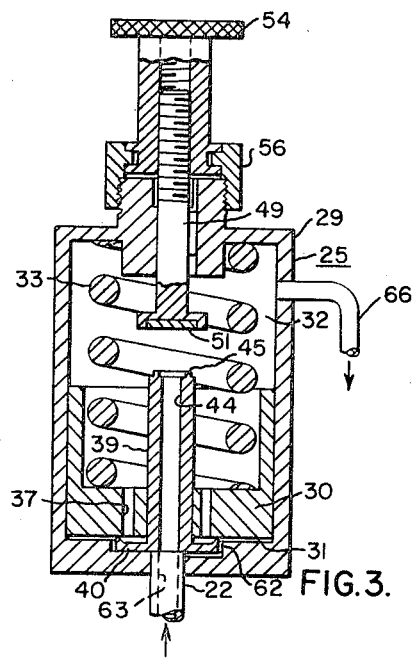
FIG. 3 is a view similar to FIG. 2 but with the regulator in another position.

However, in accordance with the invention, the pressure regulator 25 is formed and arranged as shown in FIGS. 2 and 3, wherein there is shown a housing structure 29 having a movable abutment such as a piston 30 disposed therein and dividing the housing 29 into a lower chamber 31 and an upper chamber 32. The lower chamber 31 is connectable to the conduit structure containing the hydraulic fluid to be controlled, for example the conduit 22, so that, in normal operation, the chamber 31 is pressurized by the hydraulic fluid which is to be regulated in a manner subsequently to be described.

The piston 30 is biased in downwardly direction (towards the chamber 31) by a scale spring 33 of the helical compression type interposed between the upper surface of the piston 30 and the upper wall portion 35 of the housing 29. The spring 33 may be suitably centered with respect to the longitudinal axis of the housing 29 and the piston 30 by an internal centrally disposed boss 36, so that the piston 30 is responsive to the opposing forces of the spring 33 and the fluid pressure in the lower chamber 31. The piston 30 is provided with a plurality of openings or ports 37 extending therethrough and providing a fluid communication between the lower chamber 31 and the upper chamber 32. The ports 37 may be disposed in a circular array (not shown) about the central axis of the piston 30 and the piston 30 is further provided with a central aperture 38 in which is slidably disposed a valve member 39.

The valve member 39 is provided with an enlarged lower portion defining a circular cup valve 40 of smaller cross-sectional area than the piston 30, but of sufficiently large radial extent to encompass the ports 37, and is preferably provided with a sharp annular edge portion 41 adapted to engage the lower surface 42 of the piston 30. The valve member 39 further includes a tubular central portion 43 extending upwardly through the aperture 38 in the piston 30 and into the upper chamber 32. The valve portion 43 extends coaxially with the axis of the piston 30 and has an internal passageway 44 which is open at its opposite ends. The upper end of the tubular portion 43 is provided with a circular valve seat 45. The valve member 39 as thus far described, is freely slidable in axial direction with respect to the piston 30.

The boss 36 formed in the upper portion of the housing 29 is provided with a central aperture 47 extending coaxially with the valve member 39 and the aperture 38 in the piston 30 and a valve stem member 49 is slidably supported therein. The valve stem member 49 is provided with an enlarged lower surface portion 50 having a resilient blocking member 51 disposed therein. The blocking member 51 is disposed in such a manner that it is adapted to abut the valve seat 45 and block flow through the passageway 44 from the lower chamber into the upper chamber when in a position such as shown in FIG. 2.

The valve stem member 49 is provided with a threaded shaft portion 52 extending upwardly through the boss 36 and received in the threaded nut 53 provided with a knurled knob 54. The nut 53 is provided with a circumferential recess 55 received in a suitable packing nut 56 which packing nut, in turn, is threadably connected to a mating threaded boss portion 57 of the housing 29. The boss 57 is further provided with an elongated and axially extending key way 59 and, in turn, the stem member 49 is provided with a key member 60 received in the key way 59.

By rotating the knurled knob 54 in one direction, the valve stem member 49 is translated in vertically upward direction without rotation, and held against such rotation by the key 60 and cooperating key way 59. Further, by rotating the knob 54 in the opposite direction the valve stem member 49 is rectilinearly translated in downward direction. Since the valve stem member 49 is threaded and movable by the threaded cooperation with the nut 53, the positioning of the valve stem member 49 may be attained with a high degree of precision and held in such position with substantially no lost motion. For example, if the cooperating threads are cut in such a manner that there are 24 threads to an inch, one turn of the knob 54 will move the stem member 49 $\frac{1}{24}$ of an inch and, by rotating the knob 54 through a small portion of a turn, the movement of the valve stem member 49 will be considerably less. Accordingly, the positioning of the blocking member 51 is attained with a "vernier" action.

The lower wall portion 61 of the housing 29 may further be provided with a spot faced recess 62 at least as large as the diameter of the cup valve 40 and having a groove 62a. The cross sectional surface area and shape of the opening 63 in the conduit 22 is substantially the same as that of the passageway 44 in the valve member 39. Hence, when the valve member 39 is in the lower position, as shown in FIG. 3, the opening 63 and the passageway 44 are substantially coincident and form a continuing flow path of the same cross sectional area and shape. However, if desired, the cross sectional area of the flow passageway 44 may be larger than that of the opening 63.

In addition, the housing 29 is further provided with a drain outlet 65 communicating with the upper chamber 32 and connectable to a suitable drain conduit 66 which, in turn, may be connected to a region of lower pressure than that existing in the hydraulic system.

*Operation*

Referring to FIGURE 3, wherein the fluid pressure regulating device 25 is shown in the inactive or fluid dumping position, it will be noted that the valve member 39 is in the lowermost position with the cup valve 40 seated in the recess 62, and that the piston 30 is also in its lowermost position and maintained in biased abutment with the cup valve 40 by the scale spring 33. Further, the blocking member 51 is positioned a considerable space above the valve seat 45.

In the system shown in FIG. 1, and with pressurized hydraulic fluid in the conduit structure 18, 19, 20 and 22, and the regulator in the position shown in FIG. 3, the hydraulic fluid flows through the conduit and the inlet opening 63, through the passageway 44 in the valve member 39 into the upper chamber 32, and then freely out through the outlet opening 65 to the drain conduit 66. Accordingly, the fluid is directed to drain by the regulator 25 even though the overspeed sensing mechanism 16 is latched into position to block drainage of the hydraulic fluid through its drain outlet 27.

To initiate regulating control by the regulator 25, the knob 54 is rotated by the operator in the direction to move the valve stem member 49 downwardly until the the blocking member 51 is seated on the seat 45 of the valve member 39. When the blocking member 51 is thus seated, fluid flow through the passageway 44 is interrupted and pressure is permitted to build up in the lower chamber 31 by flow through the groove 62a. As the fluid pressure builds up in the chamber 31, it is effective to oppose the bias of the scale spring 33, thereby moving the piston 30 in upward direction to a position of equilibrium, with resulting bleeding of excess fluid pressure through the ports 37 therein. Accordingly, when the blocking member 51 is moved to its lowermost position (not shown), the scale spring force is at a minimum and the pressure regulator is effective to regulate the fluid to a very low pressure value and to bleed the excess fluid through the ports 37 to the upper chamber 32 and thence to drain.

To increase the value of the regulated fluid in the chamber 31, the knob 54 is rotated in the direction to move the blocking member in upward direction and, since the flow through the flow passageway 44 is interrupted thereby, the valve member 39 will move upwardly jointly with the blocking member 51 by a following action induced by the fluid acting on the lower surface of the cup valve 40. Concomitantly therewith, the piston 30 will continue its upward movement, as determined by the increasing force of the scale spring 33 as it undergoes compression. As the biasing force of the scale spring 33 is gradually increased, the piston 30 will tend to maintain contact with the cup valve 40 until the fluid pressure within the chamber 31 exceeds the opposing force of the scale spring 33 acting on the piston and a stable position between the piston 30 and the cup valve 40 is attained, whereby the bleeding of fluid from the chamber 31 through the ports 37 is sufficient to regulate the fluid pressure in the chamber 31, as determined by the balance of the forces acting within the regulator, as mentioned above.

Accordingly, as the knob 54 moves the blocking member 51 in upward direction, the value of the regulated fluid pressure is gradually increased and the increasing fluid pressure is reflected in the conduit 19 to the throttle valve mechanism 12, thereby gradually actuating the throttle valve mechanism to the corresponding larger opening position and gradually increasing the flow of steam admitted to the turbine 11, as required during the starting up of the plant system.

FIGURE 2 shows the regulator in an intermediate operating position. It will be noted that the blocking member 51 is in an intermediate position within its range of operation from the uppermost limit to the lowermost limit so that, when in the position shown in FIG. 2, the regulator is effective to control and regulate the fluid in the chamber 31 to an intermediate value. It will be noted that in FIG. 2, the piston 30 has assumed a stable position wherein the edge 41 of the cup valve 40 is slightly spaced from the surface 42 of the piston 30, so that the bleeding of fluid therepast and through the ports 37 is maintained at a rate sufficient to provide the fluid pressure regulation within the chamber 31. In the event that the pressure from the supply of fluid (as indicated by 17) should fluctuate, the piston will reposition itself to maintain the stability of regulation of the regulator. For example, should the supply pressure 17 go up in value, the piston 30 will move upwardly in response to such increased pressure of the fluid in the chamber 31, increasing the force of the scale spring 33, and increasing the rate of fluid bled through the ports 37 in the piston 30, as required to maintain a balance. Conversely, should the supply pressure of the fluid drop for any reason, the scale spring 33 is effective to move the piston downwardly until the forces within the regulator are stabilized and the rate of the fluid bled through the ports 37 is decreased as required. Accordingly, it will be seen that the regulator is effective to control the pressure of the fluid supplied to the throttle valve mechanism to a high degree of precision, regardless of variations in the pressure of the hydraulic fluid from the supply.

Referring to FIG. 2 again, to further increase the regulated value of the fluid pressure in the chamber 31, it is merely necessary to rotate the knob 54 in the direction to move the blocking member 51 in upward direction to the required degree. If desired, the regulated pressure of the fluid in the conduit system may be determined by the employment of a suitable pressure gage 166, as illustrated in FIG. 1.

The regulator 25 may be designed to control the fluid pressure within any desired range. However, in the embodiment shown for a particular application, the regulator is arranged to control the fluid pressure in an infinite number of increments from zero to about 50 p.s.i.

When the regulator 25 is finally adjusted to substantially its maximum pressure regulating value for full load conditions, the throttle valve mechanism, in accordance with its operating characteristics, is actuated to its fully open position, thereby directing steam flow therethrough to the turbine 11 at maximum flow, as required to maintain the load on the generator 13 driven thereby.

In the envent that the load on the generator 13 is reduced or "lost" for any reason, such reduction in load on the turbine 11 is reflected by increase in speed of its output shaft 14. The overspeed sensing mechanism 16 will detect the overspeed and trip, thereby dumping the hydraulic fluid from the conduit 20 to the drain conduit 27 and immediately reducing the pressure of the control fluid in the conduit 19 and the throttle valve mechanism 12, with attendant closure of the throttle valve mechanism and termination of steam flow to the turbine 11 as required to shut down the system and prevent damage thereto.

When the pressure of the fluid in the conduit structure 18, 19, 20 and 22 drops due to dumping of the fluid by the overspeed sensing mechanism 16, the pressure of the fluid in the chamber 31 of the regulator 25 will also drop and, as the fluid pressure drops therewithin, the scale spring 33 with its preponderant force is effective to immediately move the piston 30 in downward direction to the position shown in FIG. 3. During such movement, the piston 30 will forcibly move the valve member 39 downwardly with it, thereby opening the flow passageway 44 to the upper chamber 32 and draining any excess fluid pressure contained in the regulator, since the blocking member 51 is restrained against movement by the adjusting knob 54.

In the event, for any reason, the overspeed sensing mechanism 16 is relatched to terminate fluid dumping therethrough, the fluid will now dump through the regulator 25, thereby insuring that the system is not reactivated at the last setting of the fluid regulator 25 and further insuring that the regulator is first readjusted to its lowest pressure regulating value before the blocking member 51 can again block the seat 45 to reinitiate the regulating control function of the regulator, as previously described.

The regulator 25 although quite simple in structure, as described above, is highly effective to attain with a high degree of precision the functions of assisting in draining of hydraulic fluid from the system during an overspeed condition of the shaft 14, to provide the control with a high degree of precision in slowly increasing the fluid pressure, as required to slowly open the throttle valve mechanism 12, and, in the event of shutdown in the system, to prevent inadvertent restoration of the hydraulic fluid pressure at the last and operative position of the system.

It will further be seen that all of the components in the fluid regulator 25 are substantially symmetrical about their central or longitudinal axes so that they may be easily manufactured by the usual manufacturing techniques. Further, all of the active components of the device are disposed internally within the housing 29, thereby forming a unitary structure and facilitating sealing of the mechanism against leakage and dirt from the atmosphere.

Although only one embodiment of the invention has been shown, it will be obvious to those skilled in the art that it is not so limited, but is susceptible of various other changes and modifications without departing from the spirit thereof.

We claim as our invention:

1. A hydraulic pressure regulator comprising
a housing,
a movable abutment disposed in said housing and dividing the latter into first and second chambers,
means for admitting a pressurized fluid into said first chamber,
means for discharging fluid from said second chamber to a region of lower pressure,
spring means for biasing said movable abutment toward said first chamber,
said movable abutment having a port providing a first fluid communication between said first and second chambers,
a valve member having a cup valve portion disposed in said first chamber and cooperatively associated with said port to regulate the fluid pressure in said first chamber by controlling flow of fluid to said second chamber from said first chamber,
said valve member having a portion slidably received in said movable abutment and having a passage extending therethrough providing a second fluid communication between said chambers,
a blocking member disposed in said second chamber and arranged to block flow of fluid through said passage, and
means for adjustably positioning said blocking member.

2. The structure recited in claim 1 wherein
the spring means is a helical scale spring disposed in the second chamber between the housing and the movable abutment, and
the movable abutment is a piston.

3. The structure recited in claim 1 wherein
the cup valve is effective to control and regulate the fluid pressure in the first chamber by bleeding excess fluid pressure to the second chamber through the port when the blocking member is in abutment with the valve member, and
the valve member is maintained in abutment with the blocking member as long as fluid pressure exists in the first chamber.

4. A hydraulic pressure regulator comprising
a housing,
a movable abutment disposed in said housing and dividing the latter into first and second chambers,
means for connecting said first chamber to a source of pressurized fluid,
spring means for biasing said movable abutment in a direction opposed to the pressure of the fluid, whereby said abutment is subject to the difference in pressure between said spring means and the pressurized fluid in said first chamber,
said abutment having a port providing a first fluid communication between said first and second chambers,
a cup valve in said first chamber disposed in covering relation with said port and having a surface portion smaller than the surface of said abutment,
means for discharging fluid from said second chamber to a region of lower pressure,
said cup valve having a portion slidably received in said movable abutment and providing a second fluid communication between said first and second chambers,
means in said second chamber blocking said second fluid communication,
means for jointly adjustably positioning said cup valve and said blocking means, thereby to control bleeding of excess fluid pressure through said port,
said cup valve being free to move in a direction away from said blocking means but maintained in abutment therewith by the fluid pressure in said first chamber, whereby when the fluid pressure in said first chamber is diminished said second fluid communication is established.

5. The structure recited in claim 4 wherein
the cup valve slidable portion is tubular and has an axial passage defining the second communication,
the movable abutment has a central opening through which said tubular portion extends, and
the blocking means is rectilinearly translatable into abutment with said tubular portion to block said axial passageway.

References Cited by the Examiner
UNITED STATES PATENTS
3,042,061   7/1962   Dobrikin _____ 137—102

WILLIAM F. O'DEA, Primary Examiner.

D. ZOBKIW, Assistant Examiner.